US010505954B2

(12) United States Patent
Stokes, III et al.

(10) Patent No.: US 10,505,954 B2
(45) Date of Patent: Dec. 10, 2019

(54) DETECTING MALICIOUS LATERAL MOVEMENT ACROSS A COMPUTER NETWORK

(71) Applicant: Microsoft Technology Licensing, LLC, Redmond, WA (US)

(72) Inventors: Jack Wilson Stokes, III, Northbend, WA (US); Robert James Mead, Cheltenham (GB); Tim William Burrell, Cheltenham (GB); Ian Hellen, Seattle, WA (US); John Joseph Lambert, Issaquah, WA (US); Weidong Cui, Redmond, WA (US); Andrey Marochko, Redmond, WA (US); Qingyun Liu, Goleta, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 195 days.

(21) Appl. No.: 15/622,326

(22) Filed: Jun. 14, 2017

(65) Prior Publication Data

US 2018/0367548 A1   Dec. 20, 2018

(51) Int. Cl.
*G06F 12/14*   (2006.01)
*G06F 11/30*   (2006.01)
(Continued)

(52) U.S. Cl.
CPC ........ *H04L 63/1416* (2013.01); *H04L 43/045* (2013.01); *H04L 63/145* (2013.01);
(Continued)

(58) Field of Classification Search
CPC ............. H04L 63/1416; H04L 63/1425; H04L 43/045; H04L 67/10; H04L 63/1466; H04L 63/145; H04L 63/0807; H04L 2463/146
(Continued)

(56) References Cited

U.S. PATENT DOCUMENTS 9,225,730 B1 * 12/2015 Brezinski ................ G06F 21/00
9,591,010 B1   3/2017 Muddu et al.
(Continued)

FOREIGN PATENT DOCUMENTS

WO   2016044359 A1   3/2016

OTHER PUBLICATIONS

Noureddine, et al., "A Game-Theoretic Approach to Respond to Attacker Lateral Movement", In Proceedings of International Conference on Decision and Game Theory for Security, Oct. 5, 2016, 8 pages.
(Continued)

*Primary Examiner* — Aravind K Moorthy
(74) *Attorney, Agent, or Firm* — Goff IP Law PLLC; Jared Goff (57) ABSTRACT

Graph-based detection systems and techniques are provided to identify potential malicious lateral movement paths. System and security events may be used to generate a network connection graph and detect remote file executions and/or other detections, for use in tracking malicious lateral movement across a computer network, such as a compromised computer network. Lateral movement determination across a computer network may be divided into two subproblems: forensic analysis and general detection. With forensic analysis, given a malicious node, possible lateral movement leading into or out of the node is identified. General detection identifies previously unknown malicious lateral movement on a network using a remote file execution detector, and/or other detectors, and a rare path anomaly detection algorithm.

20 Claims, 7 Drawing Sheets

(51) Int. Cl.
H04L 29/06 (2006.01)
H04L 12/26 (2006.01)
H04L 29/08 (2006.01)
(52) U.S. Cl.
CPC ...... H04L 63/1425 (2013.01); H04L 63/1466 (2013.01); *H04L 63/0807* (2013.01); *H04L 67/10* (2013.01); *H04L 2463/146* (2013.01)
(58) Field of Classification Search
USPC ..................................... 726/23, 25; 713/188
See application file for complete search history.

(56) References Cited

U.S. PATENT DOCUMENTS

| | | | | |
|---|---|---|---|---|
| 2008/0178294 | A1* | 7/2008 | Hu ........................ | G06F 21/552 726/24 |
| 2009/0027392 | A1* | 1/2009 | Jadhav ................... | G06Q 10/10 345/440 |
| 2009/0328215 | A1* | 12/2009 | Arzi ...................... | G06F 21/316 726/23 |
| 2010/0313187 | A1* | 12/2010 | Tan ...................... | G06F 11/3676 717/131 |
| 2011/0228934 | A1* | 9/2011 | Fukuda ................. | H04L 63/068 380/255 |
| 2016/0014019 | A1* | 1/2016 | Ibuki ..................... | H04W 40/30 370/216 |
| 2016/0026727 | A1* | 1/2016 | Bar-Yossef ......... | G06F 16/9535 715/205 |
| 2016/0088000 | A1* | 3/2016 | Siva Kumar ......... | H04L 63/083 726/23 |
| 2016/0299958 | A1* | 10/2016 | Kumar ................ | G06F 16/9024 |
| 2016/0301709 | A1* | 10/2016 | Hassanzadeh ...... | H04L 63/1433 |
| 2016/0308898 | A1 | 10/2016 | Teeple et al. | |
| 2017/0063911 | A1 | 3/2017 | Muddu et al. | |
| 2017/0149814 | A1* | 5/2017 | Chen ................... | H04L 63/1425 |
| 2017/0264637 | A1* | 9/2017 | Meng ................... | H04L 63/1416 |
| 2017/0272344 | A1* | 9/2017 | Tang ....................... | H04L 43/10 |
| 2017/0288974 | A1* | 10/2017 | Yoshihira .............. | H04L 41/142 |
| 2017/0288979 | A1* | 10/2017 | Yoshihira .............. | H04L 41/142 |
| 2017/0289187 | A1* | 10/2017 | Noel .................... | H04L 63/1433 |
| 2018/0136933 | A1* | 5/2018 | Kogan .................... | G06F 9/466 |
| 2018/0316704 | A1* | 11/2018 | Joseph Durairaj ......................... H04L 63/1425 | |
| 2018/0330258 | A1* | 11/2018 | Harris ................... | G06N 7/005 |

OTHER PUBLICATIONS

Neil, et al., "Towards Improved Detection of Attackers in Computer Networks: New Edges, Fast Updating, and Host Agents", In Proceedings of 6th International Symposium on Resilient Control Systems, Aug. 13, 2013, pp. 219-224.
Stephenson, et al., "Protection against the Lateral Movement of Malicious Activity", http://www.catbird.com/use-cases/Protection-against-Lateral-Spread-Attacks, Retrieved on: Apr. 17, 2017, 4 pages.
Johnson, et al., "A Graph Analytic Metric for Mitigating Advanced Persistent Threat", In Proceedings of IEEE International Conference on Intelligence and Security Informatics, Jun. 4, 2013, pp. 129-133.
"The DUQU 2.0 Technical Details", In Publication of Kaspersky Lab, Jun. 11, 2015, pp. 1-45.
Akoglu, et al., "Graph based Anomaly Detection and Description: A Survey", Nin Journal of Data Mining and Knowledge Discovery, vol. 29, Issue 3, May 2015, pp. 626-688.
Ali, et al., "Microsoft CEP Server and Online Behavioral Targeting", In Proceedings of 35th International Conference on Very Large Data Bases, Aug. 24, 2009, 4 pages.
Barabasi, et al., "Emergence of Scaling in Random Networks", in Journal of Science, vol. 286, Oct. 15, 1999, pp. 509-512.

Carminati, et al., "Rule-Based Access Control for Social Networks", In Proceedings of International Conference on on the Move to Meaningful Internet Systems, Oct. 29, 2006, pp. 1734-1744.
Delpy, Benjamin, "Mimikatz: A Little Tool to Play with Windows Security", https://github.com/gentilkiwi/mimikatz, Retrieved on: Apr. 26, 2017, 3 pages.
Dunagan, et al., "Heat-ray: Combating Identity Snowball Attacks Using Machine Learning, Combinatorial Optimization and Attack Graphs", In Proceedings of ACM SIGOPS 22nd Symposium on Operating Systems Principles, Oct. 11, 2009, pp. 1-18.
"Global Information Security Survey", In Publication of EY, 2015, 36 pages.
"Windows Security Log Events", https://www.ultimatewindowssecurity.com/securitylog/encyclopedia/Default.aspx, Retrieved on: Apr. 26, 2017, 8 pages.
Hagberg, et al., "Connected Components and Credential Hopping in Authentication Graphs", In Proceedings of 10th International Conference on Signal-Image Technology and Internet-Based Systems, Nov. 23, 2014, pp. 416-423.
Halsey, Mike, "Microsoft Sysinternals", In Publication of Springer, Sep. 9, 2016, (not provided).
Hay, et al., "Resisting Structural Re-identification in Anonymized Social Networks", In Proceedings of 34th International Conference on Very Large Data Bases, Aug. 23, 2008, pp. 102-114.
Leskovec, et al., "Graphs over Time: Densification Laws, Shrinking Diameters and Possible Explanations", In Proceedings of 11th International Conference on Knowledge Discovery in Data Mining, Aug. 21, 2005, 11 pages.
Liu, et al., "Towards Identity Anonymization on Graphs", In Proceedings of International Conference on Management of Data, Jun. 9, 2008, 14 pages.
Liu, et al., "Self-Similarity in Social Network Dynamics", In Journal of ACM Transactions on Modeling and Performance Evaluation of Computing Systems, vol. 2, No. 1, Oct. 2016, 26 pages.
Mathers, et al., "Command line process auditing", https://docs.microsoft.com/en-us/windows-server/identity/ad-ds/manage/component-updates/command-line-process-auditing, Retrieved on: Apr. 26, 2017, 6 pages.
Narayanan, et al., "De-anonymizing Social Networks", In Proceedings of 30th IEEE Symposium on Security and Privacy, May 17, 2009, 23 pages.
Neil, et al., "Scan Statistics for the Online Detection of Locally Anomalous Subgraphs", In Journal of Technometrics, vol. 55, Issue 4, Aug. 2, 2013, (not provided).
Noble, et al., "Graph-Based Anomaly Detection", In Proceedings of Ninth ACM SIGKDD International Conference on Knowledge Discovery and Data Mining, Aug. 24, 2003, 7 pages.
"Kerberos: The Network Authentication Protocol", https://web.mit.edu/kerberos/, Retrieved on: Apr. 26, 2017, 2 pages.
Oprea, et al., "Detection of Early-Stage Enterprise Infection by Mining Large-Scale Log Data", In Proceedings of 45th Annual IEEE/IFIP International Conference on Dependable Systems and Networks, Jun. 22, 2015, pp. 1-16.
Purvine, et al., "A Graph-Based Impact Metric for Mitigating Lateral Movement Cyber Attacks", In Proceedings of ACM Workshop on Automated Decision Making for Active Cyber Defense, Oct. 24, 2016, pp. 45-52.
Swiler, et al., "Computer-Attack Graph Generation Tool", In Proceedings of DARPA Information Survivability Conference & Exposition II, Jun. 12, 2001, pp. 307-321.
Walla, Mark, "Kerberos Explained", https://msdn.microsoft.com/en-us/library/bb742516(d=printer).aspx, Published on: May 2000, 5 pages.
West, Douglas Brent, "Introduction to Graph Theory", In Publication of Prentice Hall, 2001, (not provided).
Yen, et al., "An Epidemiological Study of Malware Encounters in a Large Enterprise", In Proceedings of 21st ACM SIGSAC Conference on Computer and Communications Security, Nov. 3, 2014, pp. 1117-1130.
Yen, et al., "Beehive: Large-Scale Log Analysis for Detecting Suspicious Activity in Enterprise Networks", In Proceedings of 29th Annual Computer Security Applications Conference, Dec. 9, 2013, pp. 199-208.

(56) References Cited

OTHER PUBLICATIONS

Zaharia, et al., "Spark: Cluster Computing with Working Sets", In Proceedings of 2nd USENIX Workshop on Hot Topics in Cloud Computing, Jun. 22, 2010, pp. 1-7.

Halsey, Mike, "Microsoft Sysinternals", in Publication of Springer, Sep. 9, 2016, 16 pages.

Neil, et al., "Scan Statistics for the Online Detection of Locally Anomalous Subgraphs", In Journal of Technometrics, vol. 55, Issue 4, Aug. 2, 2013, 105 pages.

West, Douglas Brent, "Introduction to Graph Theory", in Publication of Prentice Hall, 2001, 260 pages.

\* cited by examiner

DETECTING MALICIOUS LATERAL MOVEMENT ACROSS A COMPUTER NETWORK

BACKGROUND

Cyber criminals attack governmental and corporate computer networks. Once they infect one computer, they are likely to explore the network by accessing additional computers. The process by which attackers move from one computer to the next in a compromised network is referred to as lateral movement, and exaggerates the difficulties of preventing data exfiltration.

Attacks that are directed towards organizations often begin with a spearphishing campaign aimed at targeted individuals which attempts to coerce the potential victims into installing malware on their computers by opening an attachment or clicking a malicious link. Once executed, the malware typically drops a backdoor providing the attacker with remote control over the infected computer. Next, the attacker begins to use lateral movement techniques to explore the network, i.e., the process an attacker uses to move from one computer to the next in a compromised network. This is usually done by logging onto additional computers using the user's compromised credentials, exploring or creating network shares to these computers in the network, or using known tools to execute programs on remote computers. Once the attacker successfully connects to additional computers in the network, they may install redundant backdoors to provide parallel communication channels in case the originally infected computer is discovered and disabled, e.g., by the organization's information technology (IT) staff.

Lateral movement can be viewed as a set of malicious paths corresponding to the attacker's activity within a large graph of benign connections created by the daily operation of the organization's users.

There are a number of challenges posed in trying to detect lateral movement. The computer connection history can be large in scale, with hundreds of thousands computers in datasets each generating an average of 200-300 connection events in a typical day. This large-scale data creates difficulties for both accurately detecting "infected" computers, as well as designing efficient algorithms that can execute in a reasonable amount of time. Another challenge is that there are different types of computers on typical networks, including stand-alone desktops, mobile laptops, and a wide variety of servers exhibiting large numbers of network connections. The varying behaviors exhibited by each class of computers introduce additional noise into the connection data.

SUMMARY

Graph-based detection systems and techniques are provided to identify potential malicious lateral movement paths. System and security events may be used to generate a network connection graph and detect remote file executions, for use in tracking malicious lateral movement across a computer network, such as a compromised computer network. Lateral movement determination across a computer network may be divided into two subproblems: forensic analysis and general detection. With forensic analysis, given a malicious node, possible lateral movement leading into or out of the node is identified. General detection identifies previously unknown malicious lateral movement on a network using a remote file execution detector and a rare path anomaly detection algorithm.

In an implementation, a method for detecting malicious computers in a computer network comprises: generating a graph representing the computer network, the graph comprising nodes that represent computers and user accounts, and edges that represent computer connections and user logon events; determining a weight of each of the plurality of edges in the graph; determining a path-rate score for a plurality of paths in the graph using the weight of each of the plurality of edges; ranking the plurality of paths based on the path-rate score for each of the plurality of paths; and identifying the malicious computers in the computer network based on the ranking.

In an implementation, a system for detecting malicious computers in a computer network comprises: a remote file execution detector configured to detect at least one remote file execution event; a network graph construction module configured to generate a graph representing the computer network, the graph comprising nodes that represent computers and user accounts, and edges that represent computer connections and user logon events; a path-rate score module configured to determine a path-rate score for a plurality of paths in the graph; a general detection module configured to process the graph using the at least one remote file execution event and the path-rate score; a forensic analysis module configured to process the graph using a compromised computer and account list and the path-rate score; and a ranking module configured to rank the plurality of paths based on at least one of a result from the general detection module or a result from the forensic analysis module, and output results of the ranking.

In an implementation, a method for detecting malicious computers in a computer network comprises: receiving, at a forensic analysis module of a computing device, an identification of a compromised node on a network connection graph corresponding to the computer network, the compromised node indicating a malicious computer or account on the computer network; receiving, at the forensic analysis module of the computing device, a path-rate score for a plurality of paths in the network connection graph, each of the plurality of paths comprising the malicious node and at least one other node of the network connection graph; and identifying, at the forensic analysis module of the computing device, lateral movement on the computer network using the identification of the compromised node and the path-rate score for the plurality of paths in the network connection graph.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Attackers may use several different methods to perform lateral movement on a compromised network. Assume an attacker has access to a computer on this network. The attacker may be logged on to the computer using stolen credentials or may have installed malware on the computer allowing remote control using a backdoor. During lateral movement, an attacker then accesses or executes a program on a separate computer. For remote access, the attacker may use a remote access application (e.g., mstsc.exe on Windows) to log on to the other computer. One technique to access files on a remote computer is to first map the file's drive or directory on the remote computer using, for example, the "net use" command in WINDOWS. More recently, attackers have been relying more heavily on PowerShell or the Windows Management Infrastructure (WMI) command line (wmic.exe) for lateral movement on computers running the WINDOWS operating system.

Assume that, in order to avoid detection, the attacker is motivated to be active on the network for a short period of time. In other words, the attacker gains access to the network, launches the attack, achieves the desired objective such as downloading important documents or email, and exits the network quickly. Once attackers have access to a compromised computer, they may install a backdoor allowing them to lurk and wait for a better time to explore the network, e.g., doing reconnaissance at night when most network security analysts have gone home. However, once they start their lateral movement activity, they are motivated to quickly finish the exploration and data exfiltration.

Graph-based detection systems and techniques are provided to identify potential malicious lateral movement paths. Large-scale event logs collected from operational networks may be analyzed as described further herein.

Figure 1:
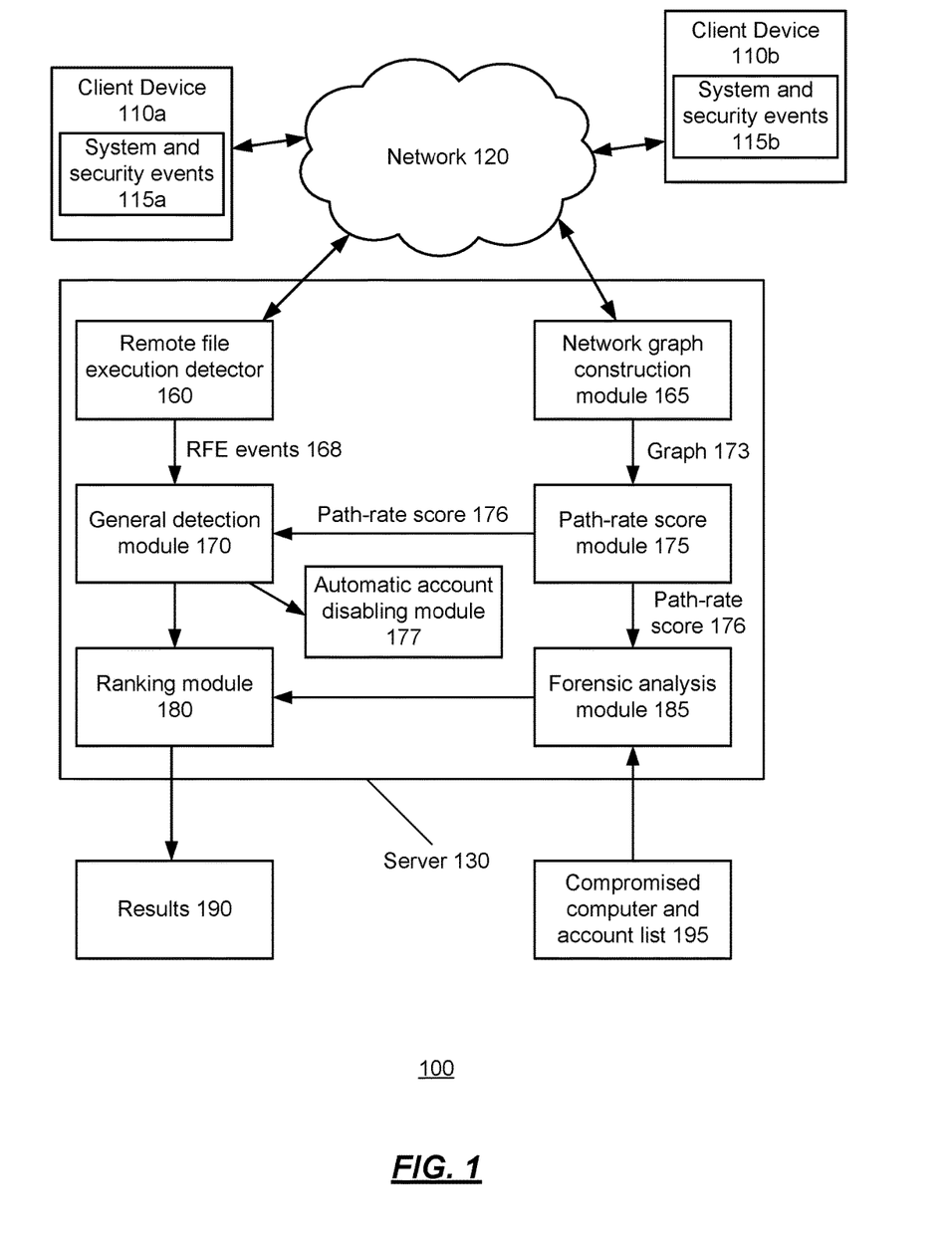
FIG. 1 is an illustration of an exemplary environment for tracking malicious lateral movement across a computer network.

FIG. 1 is an illustration of an exemplary environment 100 for tracking malicious lateral movement across a computer network. The environment 100 may include one or more client devices 110a, 110b and a server 130 in communication through a network 120. The network 120 may be a variety of network types including the public switched telephone network (PSTN), a cellular telephone network, and a packet switched network (e.g., the Internet). Although only two client devices 110a, 110b and one server 130 are shown in FIG. 1, there is no limit to the number of client devices and servers that may be supported, as well as signals and outputs of software functions that indicate connections among client devices and/or servers.

Figure 7:
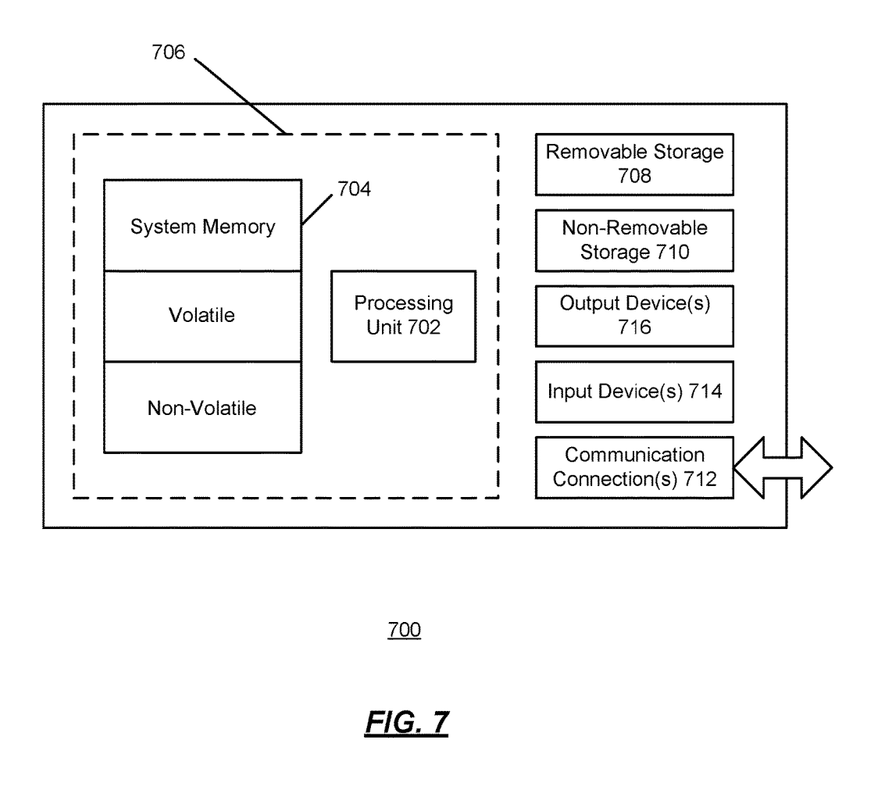
FIG. 7 shows an exemplary computing environment in which example embodiments and aspects may be implemented.

The client devices 110a, 110b and the server 130 may be implemented using a variety of computing devices such as smart phones, desktop computers, laptop computers, and tablets. Other types of computing devices may be supported. A suitable computing device is illustrated in FIG. 7 as the computing device 700.

In an implementation, system and security events are used in the tracking of the malicious lateral movement across the computer network. In an implementation, the system processes event logs generated by a network of computers such as the client devices 110a, 110b, and other computing devices (not shown, and also referred to herein as computers) in direct or indirect communication with one another via a network such as the network 120 or any other computer network. Additionally, events may be processed in real-time instead of being processed from event logs. The computers on the network of computers, as well as the user accounts associated with one or more of the computers, may run any operating system.

Each of the client devices 110a, 110b may receive, generate, and/or maintain one or more system and security events 115a, 115b. As described further herein, the system and security events 115a, 115b may be used to generate a network connection graph 173 and detect remote file executions using a remote file execution detector 160 for example, for use in tracking malicious lateral movement across a computer network, such as a compromised computer network. Other types of detectors may be used, alone or in conjunction with the remote file execution detector 160, to filter network paths by providing corroborating evidence that other types of anomalous and security-significant behavior have been detected involving the same accounts and/or hosts. Some examples of these alternative detectors include: PowerShell behavioral detectors, process execution anomaly detectors, account enumeration activity detectors, process execution and command line behavioral detectors. Similar to the remote file execution detector, combining these other detectors with the rare-path rate score can lead to the successful identification of attackers in the general detection scenario. In an implementation, the network connection graph 173 may be constructed from security events generated by Kerberos Service Ticket Requests. It is contemplated that events other than system and security events can be used to generate the graph 173. It is contemplated that other authentication networking protocols, besides Kerberos, may be used with respect to the systems and techniques described herein. Examples of other events which can generate the graph 173 include Kerberos Ticket Granting Ticket events, NT LAN Manager (NTLM) connection events, and network logon events.

More particularly, graph concepts are used for the problem of tracking lateral movements across computers and user accounts to tackle the time-efficiency problem for large-scale data. In an implementation, in a network connection graph 173, computers and user accounts are modeled as nodes, and computer-to-computer connections or user logon events are modeled as edges. A series of lateral movements across computers can be seen as paths constructed by a sequence of edges in the same direction.

A graph is a representation of a set of objects where some pairs of objects are connected. Use G=(V,E) to represent a graph, where V denotes the set of objects (v1, v2, . . . ), called nodes, and E is the set of connection relationships (e1, e2, . . . ) between pairs of nodes, called edges. If edges are considered different, e.g., they have different levels of importance, they are assigned a number which is called a weight, and this graph is referred to as a weighted graph.

If orientations of edges are considered, i.e., order exists between the connection of each pair of nodes, such edges are directed edges. For example, if there is an edge e from node v to node v', v is referred to as the source node and v' is referred to as the destination node. In addition, e is the outbound edge for v and is the inbound edge for v'. A path is a sequence of edges which connects a sequence of nodes, e.g., v1, e1, v2, e2, . . . eK, vK+1. Because the number of edges on this path is K, this path is called a K-hop path.

Lateral movement determination across a computer network may be divided into two subproblems with associated techniques: forensic analysis and general detection. With forensic analysis, given a malicious node, possible lateral movement leading into or out of the node is identified. Starting with an infected computer or user account, forensic analysis identifies other compromised computers. Thus, techniques are provided in the forensic analysis scenario to identify lateral movement paths into and out of a newly discovered compromised computer or user account.

General detection identifies previously unknown malicious lateral movement on a network using a remote file execution detector and a rare path anomaly detection algorithm. Thus, to discover a new attack, general detection identifies unknown lateral movement across nodes which are not known to be compromised. For general detection, a remote file execution detector may filter out paths in the network. In some implementations, additional or alternative detectors, including PowerShell and command line processors, may be used to filter out paths in the network by providing corroborating evidence that other types of anomalous and security-significant behavior have been detected involving the same accounts and/or hosts. Some examples of these alternative detectors include: PowerShell behavioral detectors, process execution anomaly detectors, account enumeration activity detectors, process execution and command line behavioral detectors. Similar to the remote file execution detector, combining these other detectors with the rare-path rate score can lead to the successful identification of attackers in the general detection scenario.

The server 130 (or one or more other computing devices) may comprise a remote file execution detector 160, a network graph construction module 165, a general detection module 170, a path-rate score module 175, an automatic account disabling module 177, a ranking module 180, and a forensic analysis module 185. Although the remote file execution detector 160, the network graph construction module 165, the general detection module 170, the path-rate score module 175, the automatic account disabling module 177, the ranking module 180, and the forensic analysis module 185 are shown as residing on the server 130, some or all of these components can reside on, or be distributed among, one or more other computing devices, but otherwise accessible by the client devices 110a, 110b, and the server 130, such as through a network such as the network 120.

The remote file execution detector 160 is used to detect possible remote file execution based on system and security events, such as the system and security events 115a and/or 115b. As is well known, remote file execution occurs when a user on one computer runs a program on a second computer and is often used by attackers during lateral movement. Once an attacker has obtained the credentials to a privileged account, such as a domain administrator, a remote file execution (RFE) can be used to infect other computers on the network at will. Example system and security events are described further herein.

Classes of RFE extend beyond service installation. Misuse of the remote registration of scheduled tasks, the WMI Win32 Process class and the Windows Remote Management (WinRM) have also been observed in the pursuit of lateral movement. Remote service installations or task registrations are immediately preceded by a network logon from the user performing the action as a result of the associated Remote Procedure Call (RPC) endpoint interaction. Additionally, when the service or task is started following the installation, a process creation related to the service or task that was installed may be observed. At the core of this detection technique are the service installation and task registration events. From these events, one can correlate backward-in-time with the logon event to identify whether there were any network logon success events by the user who installed the service or task. Finding a match between these within a short time-frame is highly correlated with a remote service installation or task registration. To bring further context to these events, extend the correlation by looking for a process creation event and any share access event that may be associated with this activity. In summary, look for a combination of the following: a remote logon; a service installation or task registration resulting from that logon; a process creation event of the executable pointed to by the service or task; and optionally, an ADMIN$ share access attempt. Although examples and implementations described herein may refer to WINDOWS, the examples and implementations are not limited to WINDOWS, and it is contemplated that the examples and implementations described herein can also be applied to other operating systems such as Linux, MacOS, iOS, Android, etc.

Regarding logon correlation, for a remote service installation event, the Event/System/Security@UserID contains the security identifier (SID) of the user account that installed the service. Search backward-in-time from the installation event to find a matching Network Logon Success event where the TargetUserSid values match. In the case of a task registration, the user account that registered the task in the UserContext field of the event is provided. This information may be used in a similar way to trace the registration back to any remote network logon success event for that user by correlating UserContext with the TargetUserName and TargetDomainName fields.

In the case of the task registration, the path to the executable is not provided. The Event/System/Correlation@ActivityID field in the XML provides a robust mechanism to find any associated "Task Created Process" events for this task. Performing a forward-in-time correlation on the Activity ID, or where this is not available the TaskName, provides a reliable method of obtaining the executable's path.

Once a remote task or service installation has taken place and has been identified, this can be correlated forward-in-time with any associated process execution events. Given the name, path, and ID of the process from the service or task data, look for the first process execution event that matches this criterion. Additionally, restricting the user and logon ID associated with the process execution to be a system session with a logon ID of '0x3e7' in the event indicates that it is a service installation.

Between the time of the remote logon and the service or task installation, also look for a Share Access event for the \\*\ADMIN$ share. This may be used as evidence that a file may have been written remotely at the time of its execution. The Subject user details in the file share event correlates with the target user details from the success logon event, in addition to the IP address that is the source of the share access and logon. The result of this process is a high fidelity detection of a remote service or task installation, enriched with the full logon event, resulting process execution and, if available, the ADMIN$ share access used to write the file that is executed. This refined RFE data can be used to detect lateral movement on a computer network by identifying rare or uncommon instances, as well as provide a rich, valuable data source for analysts and incident responders.

The network graph construction module 165 uses system and security events to construct a network connection graph 173 and detect potential remote file executions. In an implementation, the network graph construction module 165 uses Kerberos Service Ticket Request events in the generation of the network connection graph 173. Kerberos is a computer network authentication protocol which allows nodes communicating over a non-secure network to prove their identity to another in a secure manner. In an implementation, each of the Kerberos Service Ticket Request events indicates a computer-to-computer connection or a user account-to-computer connection. These connections can be used to generate a graph 173 that shows the connections between the various nodes (e.g., the accounts and computers and their connections and relationships).

In an implementation, the lateral movement detection problem is modeled with graph concepts. Nodes represent computers or user accounts, and edges indicate network connection events such as a user logging onto a computer or a computer connecting to another computer. Because there is order between the connection of a pair of nodes, directed edges are considered in the model. Using this graph-based framework, a series of lateral movements can be represented as a path through the network connection graph 173. The system may be implemented as an off-line system or may be implemented in a streaming environment, depending on the implementation. Periodically, (e.g., hourly, daily, etc.), the source and destination computers and user accounts are collected from the Kerberos Service Ticket Request event logs. Each Kerberos record represents an edge in the graph, with a source node, a destination node, and a timestamp indicating when this connection occurred.

Malicious lateral movement subgraphs may be identified in the network connection graph 173. Lateral movement paths can take several forms including linear paths, directed acyclic graphs (DAGs), or cyclic graphs. To facilitate accurate and efficient processing, search for malicious subpaths (i.e., rare K-hop paths), and then construct the overall malicious graph by joining these subpaths together based on a match of the source node, destination node, and timestamp.

Input parameters may include: K (the number of hops in suspicious paths); X (the number of days which are analyzed to generate the path-rate score); T (the time constraint for filtering improbable lateral movement connections); F (the node indegree and outdegree threshold used to filter out computers with a large number of connections); and D (the path-rate score threshold for automatic disabling).

Thus, one input parameter to the system is K, the number of hops in suspicious paths which can also be considered the desired subpath length. It has been determined that the number of K-hop paths in the network increases exponentially as K increases. In an implementation, K may be set equal to 2. In other implementations, longer subpaths with length K≥3 may be used. In an implementation, results for 1-hop paths may be generated in case the attacker fails to make a second movement to a third node. In addition, some servers or other computers located on the network contribute to an extremely large number of connections. For example, the computers with such a high indegree or outdegree are domain controllers (DCs), AppLocker servers, and Windows Event Forwarding (WEF) servers. To prune the search space further in the general detection scenario (described further herein), a filtering mechanism may be used (e.g., node filtering) to remove nodes with an indegree or outdegree which is greater than or equal to the threshold F (e.g., F=10,000). Node filtering may not be used in the forensic analysis scenario (described further herein) because the graph is already filtered based on the known compromised node.

The general detection module 170 combines the output RFE events 168 of the remote file execution detector 160 and the path-rate score 176 from the path-rate score module 175 to detect compromised nodes. The general detection module 170 detects malicious lateral movement without the knowledge of any previously discovered compromised nodes. The general detection module 170 searches for lateral movement using the path-rate score 176 in combination with possible remote file execution detections (i.e., the RFE events 168) on a network.

In addition, the results of the general detection module 170 can lead to automatic disabling of compromised user accounts or computers by the automatic account disabling module 177. The automatic account disabling module 177 may be used to automatically disable user accounts or computers (disable compute network access) in order to prevent attackers from using lateral movement techniques to compromise other nodes in the network. Automatic node disabling may be performed when a possible remote file execution is detected and the path-rate score is less than the threshold D. This threshold may be tuned by system administrators (e.g., to trade off potential false positives and false negatives).

From the network connection graph 173, a path-rate score 176 may be determined by the path-rate score module 175, which provides a measure of how rare (i.e., anomalous) a path is in a computer network. The path-rate score module 175 assigns a weight to a connection based on its frequency over some period of time. In an implementation, assign a weight to each directed edge, w(v,v'), calculated as the rate of connection from v to v' over an X-day history of data:

$$w(v,v')=C(v,v')/X \qquad (1)$$

where C(v,v') denotes the number of days v connects to v' during a period of X days (alternatively, C can be the number of counts per day or other time period, for example). The weight w ranges between 0 and 1 (the closer to 0 that w is, the rarer the path is). Alternative methods of determining and/or assigning weights may be used. The path-rate score, p, of a K-hop path is calculated by the multiplication of the weights of all its constituent edges:

$$p=w(v1,e1,v2,e2,\ldots eK,v(K+1))=w(vi,V(i+1)). \qquad (2)$$

Because paths are intended to model lateral movement across nodes within a network, several time constraints may be added to filter out impossible paths. First, edges to be created in sequence with $$\text{time}(ei)<\text{time}(e(i+1)) \text{ for } i=1,2,\ldots,k-1 \qquad (3)$$

where time(ei) denotes the timestamp when edge ei is created. Equation (3) may be used to eliminate infeasible paths based on timestamps. Next, assume that attackers do not remain on the network for an extended period of time, so all the edges in a path must be created within a certain period of time:

$$|\text{time}(e1)-\text{time}(e(i-1))|<T \qquad (4)$$

where |*| represents the absolute value, and T is a user-defined input threshold representing the maximum amount of time attackers use to make a pair of consecutive lateral movement hops on the network.

Varying T is a tradeoff between potential false positives, false negatives, and the number of results that are output. When T is small, the filtered subgraph is small and will only detect quick lateral movements. However, a lateral movement may be missed (i.e., a false negative) if the attacker introduces large delays between hops. On the other hand, using large values of T results in a large number of potential lateral movement paths which can lead to increased false positives.

The ranking module 180 may rank the outputs from the general detection module 170 and/or the forensic analysis module 185 to aid in the determination of previously unknown compromised nodes. Regarding ranking and discovery, the path-rate score module 175 generates all possible paths and calculates the corresponding path-rate score, p, for each path. The ranking module 180 ranks these paths in ascending order of the path-rate score. The highest ranked paths, with the lowest score, are the most rare and are more likely to correspond to malicious lateral movement. In the forensic analysis case, a user (e.g., an analyst) can investigate other highly ranked paths to discover additional compromised nodes. For general detection, a user (e.g., an analyst) can focus on nodes with a remote file execution detection and highly ranked path-rate scores for manual investigation or additional monitoring. The results 190 are output.

The forensic analysis module 185 receives a compromised computer and account list 195 as input. Given the list 195 of one or more compromised computers or accounts, the path-rate score 176 is used in discovering additional compromised nodes (i.e., forensic analysis). Regarding the forensic analysis module 185, the forensic analysis scenario assumes there is a list of compromised nodes as an additional input feature, which contains at least one known compromised computer or user account. Forensic analysis identifies malicious lateral movement paths into and out of each compromised node. To do so, set this infected node as either the starting or ending node in the 2-hop path, and apply the path-rate score 176 to generate the possible outbound or inbound paths. Because only a single malicious node is considered, the majority of the rare 2-hop paths are filtered out, revealing a limited number of suspicious paths to investigate manually (e.g., by a user, analyst, system administrator, etc.). Once a malicious lateral movement subgraph is confirmed, add the two newly discovered nodes to the compromised computer and account list 195. When there are multiple infected nodes in the list 195, repeat the process for each additional node. In an implementation, these individually confirmed paths can be combined to reveal the entire malicious lateral movement graph.

In an implementation, given the large-scale datasets (e.g., there are millions of nodes and hundreds of millions of edges), the techniques herein may be implemented in large cluster using a MapReduce framework. This framework supports a SQL-like syntax, and includes a distributed storage component. After parsing the users' input code, it generates a parallel, optimized "execution plan" for the defined queries. A tool with a graphical user interface for analysts to query the results may be used. The tool accesses the logs, which are stored on the cluster, through the interactive platform for fast response.

Example system and security events that may be used to build the network connection graph and detect remote file executions include the following. Note that the following examples are described with respect to the WINDOWS operating system, and that similar events on other operating systems are contemplated and may be generated and used on other operating systems depending on the implementation.

Event ID 4769, corresponding to a Kerberos Service Ticket Request. The WINDOWS security event 4769 may be used to create the network connection graph 173. A 4769 WINDOWS security event is generated whenever a new Kerberos service ticket is requested. The Kerberos network protocol involves six steps for a client user account or computer to connect to another computer. First, the user requests a Kerberos Ticket Granting Ticket (TGT) from the Kerberos Key Distribution Center (KDC). The KDC returns a TGT to the user which is encrypted with a hash of the user's password. If the user can successfully decrypt the TGT, it is then submitted to the KDC's Ticket Granting Service in order to obtain a Kerberos service ticket. The Kerberos service ticket is then provided to the network service to authenticate the user and allow a connection to a remote computer. The 4769 WINDOWS security event is generated in response to the third step when the user requests the Kerberos service ticket from the Key Distribution Center's Ticket Granting Service. In an alternative implementation, the graph can be generated with 4768 TGT security events, which correspond to the request of a Kerberos Ticket Granting Ticket. With this, the computer name is not provided for the destination computer—only the destination IP address is collected. The graph can be implemented or extended using the 4768 security events, using a separate process which queries the Windows Active Directory periodically (i.e., daily) to resolve the destination node name. As described further herein, network logon events and NTLM events can also be used, e.g., to improve the graph.

A Service Control Manager (SCM), Event ID 7045, is directed to service installation. WINDOWS services are programs which run in the background of the operating system, and these services are controlled by the Service Control Manager. The 7045 WINDOWS security event is generated on a WINDOWS computer when a service is installed via the Service Control Manager. Because services that are installed remotely over Remote Procedure Call (RPC) also use the SCM, this event may be observed whenever this technique is used.

Regarding tasks, Event ID 106 corresponds to Task Registered. This event is generated on a WINDOWS computer when a scheduled task is registered for the first time. When a scheduled task is registered remotely, this event is always logged. Event ID 129 correspond to a created task process. This event is generated as a result of the execution of a scheduled task and contains details of the process that was executed on task start.

Regarding security auditing, Event ID 4624 corresponds to a success logon event. The 4624 event indicates there was a successful logon to a WINDOWS account. This event allows for the correlation of a service installation (7045) or task registration (106) with the logon of the user that performed the action. This enables two scenarios. First, it can be verified that the service installation or registration was the result of a remote logon from the user. Second, additional information about the installation can be obtained, such as the source internet protocol (IP) address.

Event ID 4688 corresponds to process creation. Knowing the process destined to be executed by the service or task, process creation data can be searched for the process start event associated with it and incorporate additional information from this event as well.

Event ID 5140 corresponds to file share. This event is logged when a file share is accessed. By associating \\*\ADMIN\$ share accesses with the 4624 logon event that installed the task or service, it can be shown that a file was potentially written to the remote computer at the same time.

Figure 2:
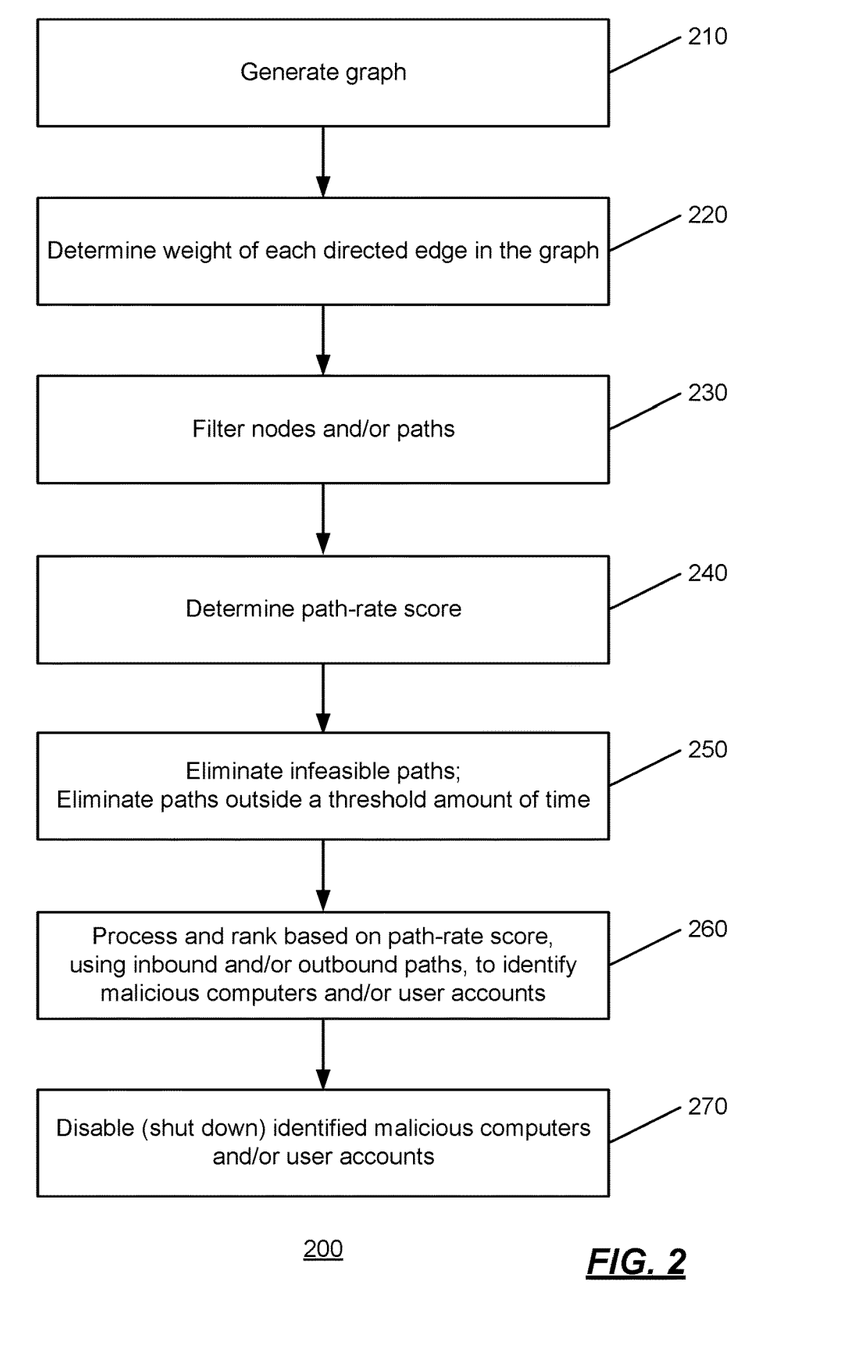
FIG. 2 is an operational flow of an implementation of a method for tracking malicious lateral movement across a computer network.

FIG. 2 is an operational flow of an implementation of a method 200 for tracking malicious lateral movement across a computer network. At 210, a graph, such as the graph 173, is generated. The graph 173 may be generated by the network graph construction module 165, using system and security events received from one or more computers in the computer network being monitored for malicious lateral movement.

At 220, a weight of each directed edge in the graph 173 is determined, e.g., using equation (1) above by the path-rate score module 175. Optionally, at 230, nodes and/or paths may be filtered from the graph 173 to decrease the number of paths that are to be subsequently processed by the path-rate score module. This may increase the subsequent speed and efficiency of processing.

At 240, a path-rate score, such as the path-rate score 176, is determined for each path in the graph 173. The path-rate score 176 may be determined by the path-rate score module 175, using equation (2) above. The path-rate score 176 for each path may be provided to the general detection module 170 and the forensic analysis module 185.

Optionally, at 250, infeasible paths are eliminated, and paths outside a threshold amount of time are eliminated. Infeasible paths may be eliminated using equation (3) above, and paths outside a threshold amount of time may be eliminated using equation (4) above.

At 260, processing is performed by the general detection module 170 and/or the forensic analysis module 185 as described further herein, and ranking is performed based on the path-rate score 176, using inbound and/or outbound paths, to identify malicious computers and/or user accounts. At 270, the identified malicious computers and/or user accounts may be shut down (i.e., disabled).

Regarding forensic analysis, a user, analyst, system administrator, etc. may discover that a computer on their network is infected and want to identify other compromised computers in the network. The lateral movement, forensic analysis problem, is described with respect to FIGS. 3 and 4, as determining which user accounts and/or computers in the network graph were connected to the infected computer and which computers were later contacted by the infected computer. In this scenario, the infected computer may be the source of the initial infection, an intermediate node in the lateral movement path, or the final destination in the attack.

Figure 3:
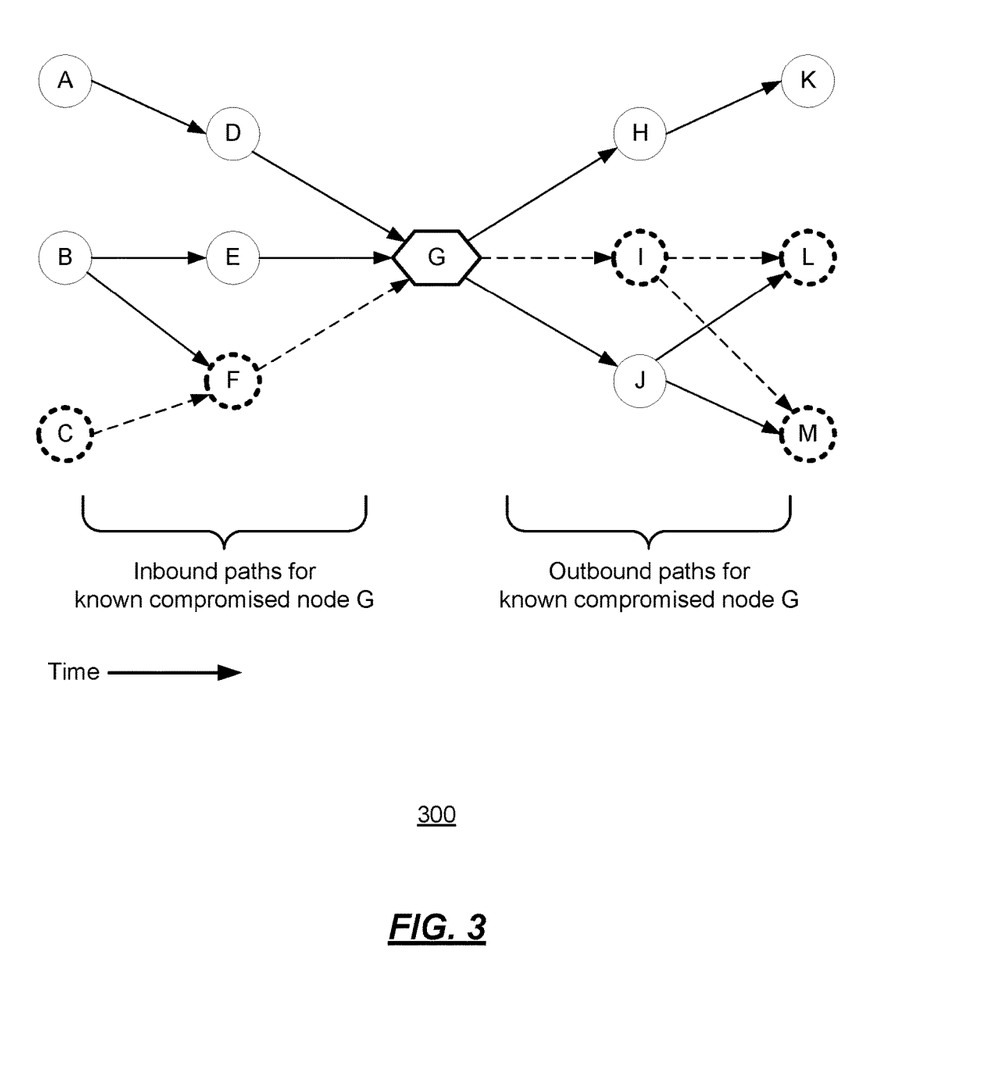
FIG. 3 is an illustration of a network connection graph useful for describing forensic analysis with respect to tracking malicious lateral movement across a computer network.

FIG. 3 is an illustration of a network connection graph 300 useful for describing forensic analysis with respect to tracking malicious lateral movement across a computer network. The network connection graph 300 shows 13 nodes (nodes A-M), with node G being a known compromised (i.e., infected) node (i.e., a compromised computer or account in the computer network represented by the network connection graph 300).

For the forensic analysis problem depicted in FIG. 3, consider both inbound and outbound paths of the compromised computer (node G). For inbound path analysis, search for other compromised computers which connect to the known infected computer (node G). The connection can either be direct or indirect. A direct connection occurs between a computer which directly connects to the compromised computer (i.e., 1-hop away), such as nodes D, E, and F with respect to node G. Indirect connections are between computers located two or more hops away from the known infected computer, such as nodes A, B, and C with respect to node G (the two hops being, for example, the path from node A to node D to node G, the path from node B to node E to node G, the path from node B to node F to node G, and the path from node C to node F to node G).

Similarly for outbound paths, search for computers which the known infected computer (node G) connects to. Again, these additional infected computers may be located 1-hop away from the infected computer in the case of a direct connection (nodes H, I, and J with respect to node G) or two or more hops away for indirect connections (node K, L, and M with respect to node G, variously via nodes H, I, and J).

Thus, in FIG. 3, a known compromised node (denoted as nod G) is discovered and the task is to identify the unknown compromised computers and user accounts (dashed nodes C, F, I, L, and M) along the malicious access path (dashed lines). Searching for potentially compromised nodes which connect to the known compromised node considers inbound paths, while discovering downstream nodes which are connected to by the known compromised node studies outbound paths.

For the forensic analysis problem, the network connection graph is processed with the path-rate score 176 and the forensic analysis module 185 for generating the lateral movement graph with the detection of one or more confirmed malicious (i.e., infected) computers or user accounts.

Figure 4:
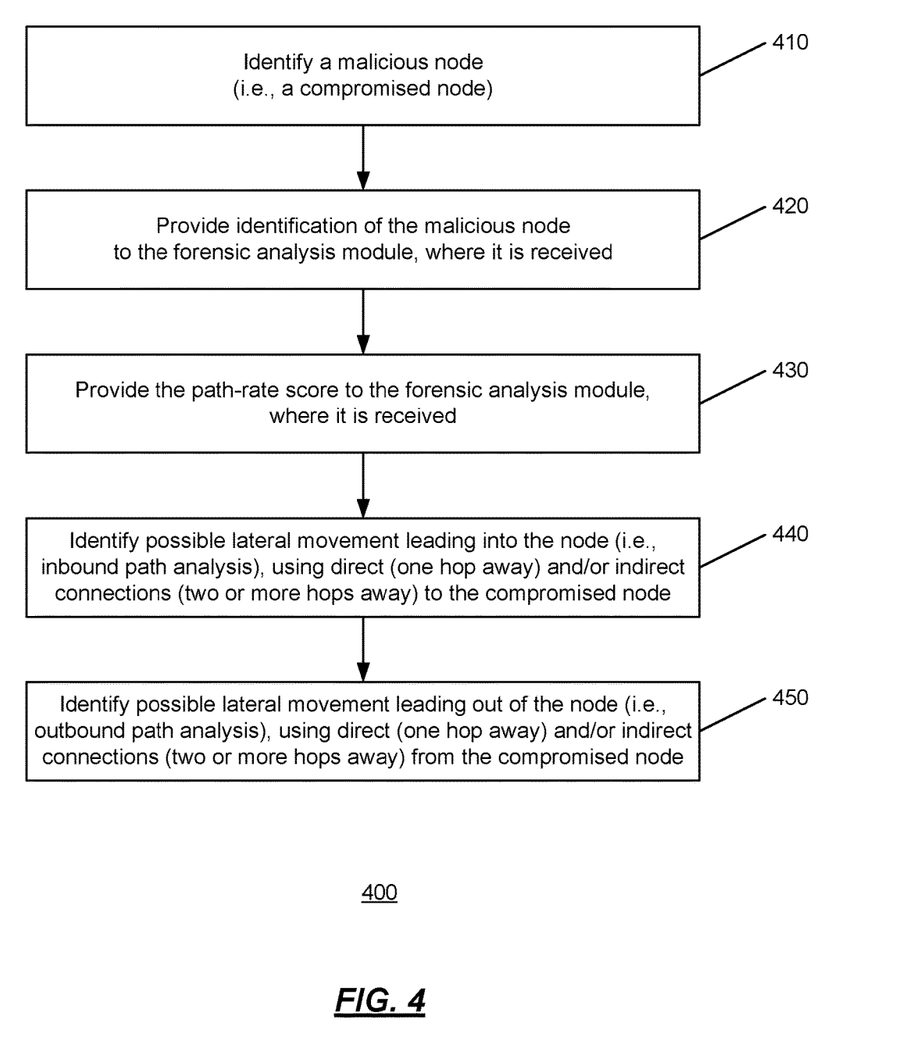
FIG. 4 is an operational flow of an implementation of a forensic analysis method that may be used for tracking malicious lateral movement across a computer network.

FIG. 4 is an operational flow of an implementation of a forensic analysis method 400 that may be used for tracking malicious lateral movement across a computer network. The method 400 may be implemented by the forensic analysis module 185.

At 410, a malicious node (i.e., a compromised node, computer, or account) is identified on a network connection graph, such as the graph 173 or the graph 300. At 420, the identification of the malicious node is provided to the forensic analysis module 185, e.g., via the compromised computer and account list 195. At 430, the path-rate score 176 is provided to the forensic analysis module 185 by the path-rate score module 175.

At 440, inbound path analysis is performed. For example, with respect to FIG. 3, the paths into compromised node G from nodes A, B, C, D, E, and F are analyzed as set forth above.

At 450, outbound path analysis is performed. For example, with respect to FIG. 3, the paths out of compromised node G to nodes H, I, J, K, L, and M are analyzed as set forth above.

Figure 5:
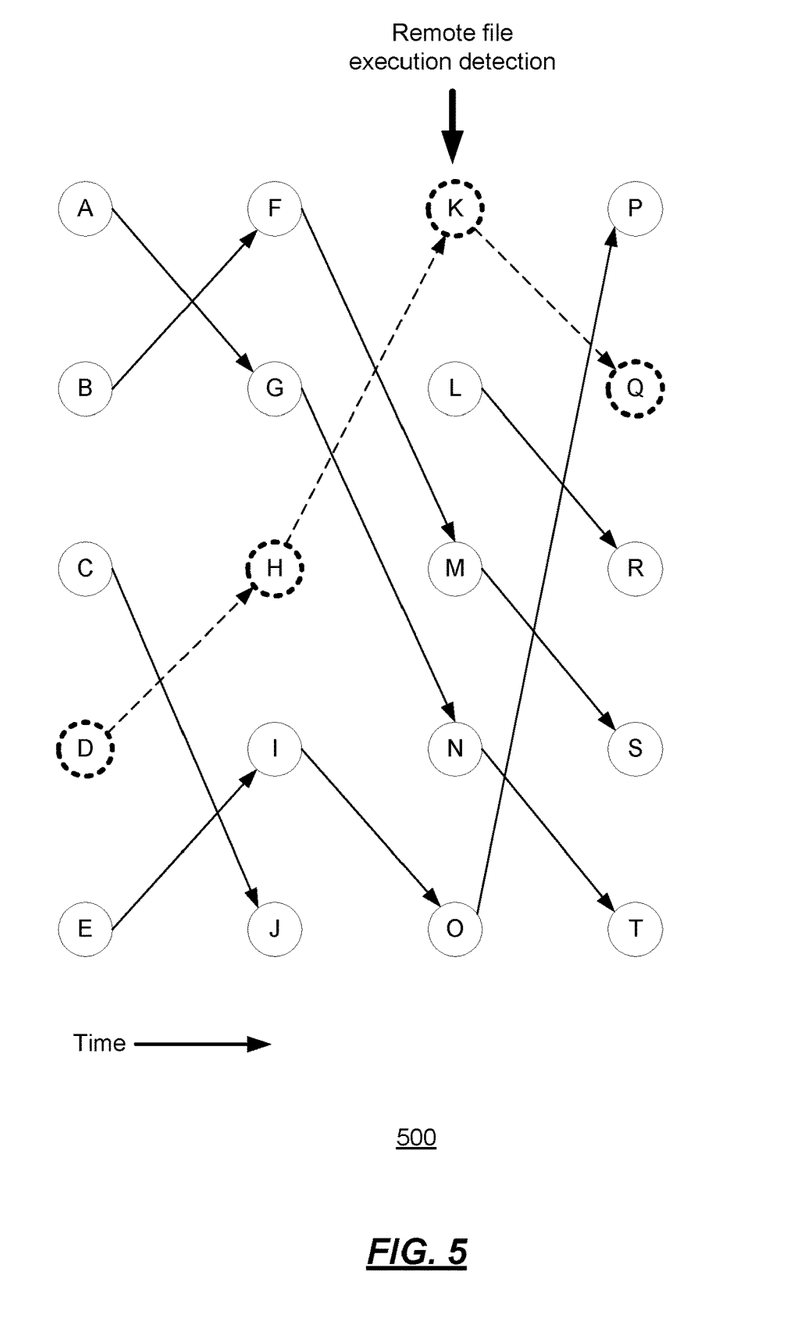
FIG. 5 is an illustration of a network connection graph useful for describing general detection with respect to tracking malicious lateral movement across a computer network.

FIG. 5 is an illustration of a network connection graph 500 useful for describing general detection with respect to tracking malicious lateral movement across a computer network. FIG. 5 is a diagram of general detection and represents the user accounts and computers in a large-scale network without any prior confirmed intrusions. The network connection graph 500 shows 20 nodes (nodes A-T). Unlike the network connection graph 300 described with respect to FIG. 3, there are no known compromised nodes in the network connection graph 500. In the graph 500, node K has been identified as suspicious pursuant to generating a remote file execution detection alert (e.g., node K has an RFE event 168 associated with it). As noted further herein, alternate detections are possible in addition to, or instead of, RFE.

Regarding the general detection problem, while forensic analysis deals with the case where an infected computer is already known, general detection involves identifying infected computers or compromised user accounts and the lateral movement paths in the network connection graph without any prior confirmed detections. In other words, the task is to discover the initial infected computer or compromised user account. To aid in the detection of malicious lateral movement, FIG. 5 indicates that one suspicious computer (node K) in the network has generated an alert indicating a potential remote file execution, a key component of lateral movement. The lateral movement path is recovered from rare paths which include the computer involved with the remote file execution detection. FIG. 5 shows that the general detection ultimately determines that nodes D, H, K, and Q are compromised.

Additionally, for the general detection problem, relying on the path-rate score alone leads to too many potential, but legitimate, rare paths for manual investigation by analysts. To overcome this problem, the general detection module 170 combines the path-rate score with possible remote file execution detections to filter out the majority of the benign lateral-movement paths. In an implementation, the remote file execution detector 160 correlates various system and security events caused by the installation of a new service or service, or the creation of a new process.

Figure 6:
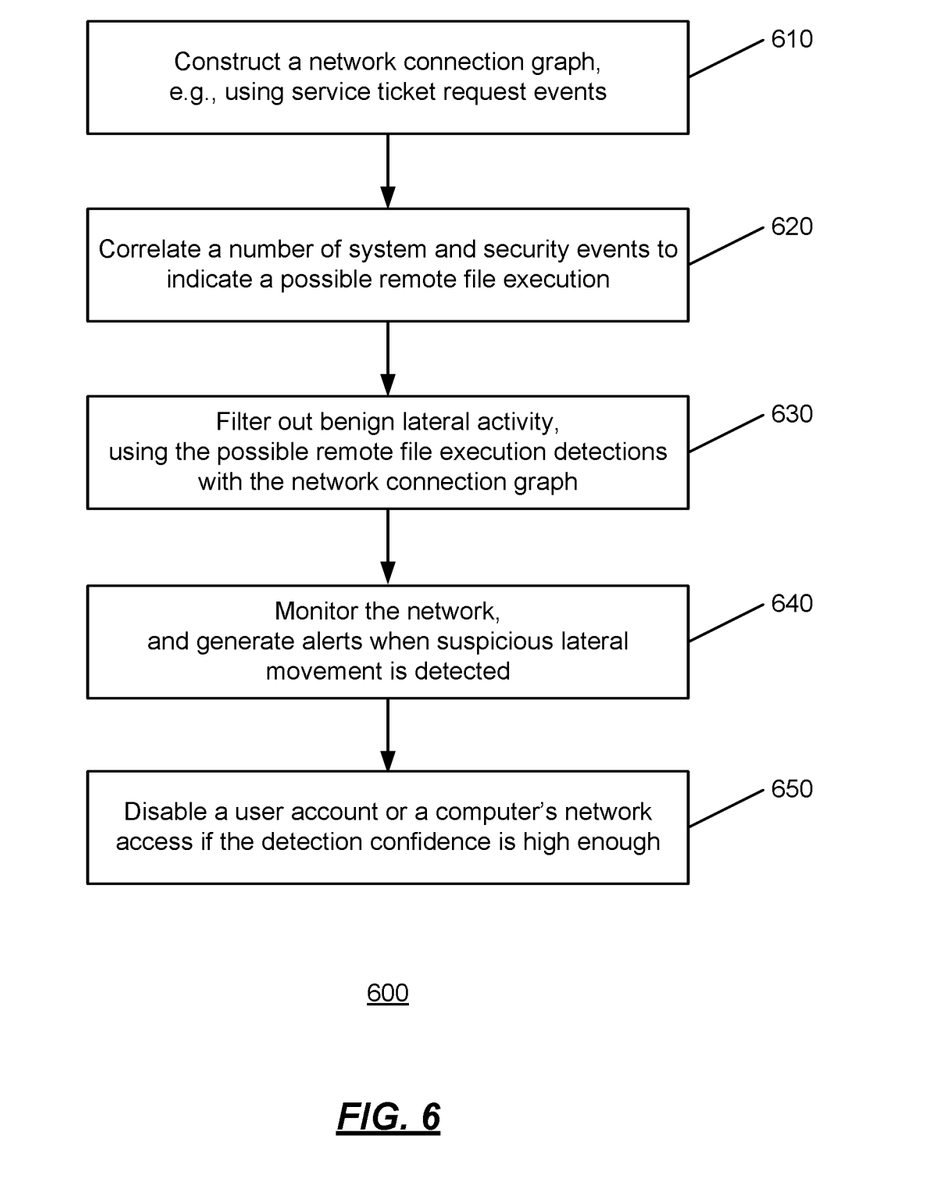
FIG. 6 is an operational flow of an implementation of a general detection method that may be used for tracking malicious lateral movement across a computer network.

FIG. 6 is an operational flow of an implementation of a general detection method 600 that may be used for tracking malicious lateral movement across a computer network. Using this technique, lateral movement may be detected on a network which is believed to be secure.

At 610, a network connection graph is constructed, e.g., using service ticket requests, such as Kerberos Service Ticket Request events.

At 620, a number of system and security events are correlated to indicate a possible remote file execution. At 630, benign lateral movement activity is filtered out, using the possible remote file execution detections with the network connection graph.

At 640, the network is monitored, and alerts are generated when suspicious lateral movement is detected. At 650, a user account or a computer's network access is disabled if the detection confidence is high enough.

FIG. 7 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by the device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communication connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a method for detecting malicious computers in a computer network comprises: generating a graph representing the computer network, the graph comprising nodes that represent computers and user accounts, and edges that represent computer connections and user logon events; determining a weight of each of the plurality of edges in the graph; determining a path-rate score for a plurality of paths in the graph using the weight of each of the plurality of edges; ranking the plurality of paths based on the path-rate score for each of the plurality of paths; and identifying the malicious computers in the computer network based on the ranking.

Implementations may include some or all of the following features. The method may further comprise filtering a plurality of the nodes from the graph, prior to determining the path-rate score for the plurality of paths in the graph. The method may further comprise filtering at least one of the plurality of the paths from the graph prior to determining the path-rate score. Determining the path-rate score for the plurality of paths in the graph may comprise computing the path-rate score for each path along a rare path in the graph. The method may further comprise eliminating infeasible paths from the graph. The method may further comprise eliminating paths outside a threshold amount of time from the graph. The method may further comprise disabling the identified malicious computers. The method may further comprise identifying a malicious user account in the computer network based on the ranking, and disabling the malicious user account. The plurality of paths may comprise 1-hop paths and 2-hop paths. The method may further comprise performing forensic analysis on the graph, wherein ranking the plurality of paths is further based on a result of the forensic analysis. The method may further comprise performing general detection on the graph, wherein ranking the plurality of paths is further based on a result of the general detection.

In an implementation, a system for detecting malicious computers in a computer network comprises: a remote file execution detector configured to detect at least one remote file execution event; a network graph construction module configured to generate a graph representing the computer network, the graph comprising nodes that represent computers and user accounts, and edges that represent computer connections and user logon events; a path-rate score module configured to determine a path-rate score for a plurality of paths in the graph; a general detection module configured to process the graph using the at least one remote file execution event and the path-rate score; a forensic analysis module configured to process the graph using a compromised computer and account list and the path-rate score; and a ranking module configured to rank the plurality of paths based on at least one of a result from the general detection module or a result from the forensic analysis module, and output results of the ranking.

Implementations may include some or all of the following features. The system may further comprise an automatic account disabling module configured to disable at least one of a malicious computer or a malicious user account responsive to the results of the ranking. The remote file execution detector may be configured to detect the least one remote file execution event from at least one computing device of the computer network. The ranking module may be configured to identify at least one of a malicious computer or a malicious user account in the computer network based on the ranking. The plurality of paths may comprise 1-hop paths and 2-hop paths.

In an implementation, a method for detecting malicious computers in a computer network comprises: receiving, at a forensic analysis module of a computing device, an identification of a compromised node on a network connection graph corresponding to the computer network, the compromised node indicating a malicious computer or account on the computer network; receiving, at the forensic analysis module of the computing device, a path-rate score for a plurality of paths in the network connection graph, each of the plurality of paths comprising the malicious node and at least one other node of the network connection graph; and identifying, at the forensic analysis module of the computing device, lateral movement on the computer network using the identification of the compromised node and the path-rate score for the plurality of paths in the network connection graph.

Implementations may include some or all of the following features. Identifying lateral movement may comprise identifying lateral movement into the compromised node. Identifying lateral movement may comprise identifying lateral movement out of the compromised node. Identifying lateral movement may comprise using 1-hop connections with the compromised node and using 2-hop and/or other multi-hop (e.g., 3-hop, 4-hop, etc.) connections with the compromised node.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for detecting malicious computers in a computer network, the method comprising:
    generating a graph representing the computer network, the graph comprising nodes that represent computers and user accounts, and edges that represent computer connections and user logon events;
    determining a weight of each of the edges in the graph;
    determining a path-rate score for a plurality of paths in the graph using the weight of each of the edges;
    filtering from the plurality of paths in the graph a time-excluded set of one or more paths that does not meet one or more time constraints;
    ranking a ranked set of the plurality of paths based on the path-rate score for each path in the ranked set of the plurality of paths; and
    identifying the malicious computers in the computer network based at least in part on the ranking and based at least in part on the filtering out of the time-excluded set of one or more paths.

2. The method of claim 1, further comprising filtering a plurality of the nodes from the graph, prior to determining the path-rate score for the ranked set of the plurality of paths in the graph.

3. The method of claim 2, further comprising filtering at least one of the plurality of the paths from the graph prior to determining the path-rate score.

4. The method of claim 1, wherein determining the path-rate score for the ranked set of the plurality of paths in the graph comprises computing the path-rate score for each path along a rare path in the graph.

5. The method of claim 1, wherein the filtering the time-excluded set of one or more paths from the plurality of paths in the graph comprises eliminating one or more infeasible paths from the graph based on determining that timestamps of each of the one or more infeasible paths indicate one or more infeasible sequences of edges in each of the one or more infeasible paths.

6. The method of claim 1, wherein the one or more time constraints comprises a threshold amount of time, and wherein the filtering the time-excluded set of one or more paths from the plurality of paths in the graph comprises filtering one or more paths outside the threshold amount of time.

7. The method of claim 1, further comprising disabling the identified malicious computers.

8. The method of claim 1, further comprising identifying a malicious user account in the computer network based at least in part on the ranking, and disabling the malicious user account.

9. The method of claim 1, wherein the plurality of paths comprise 1-hop paths and 2-hop paths.

10. The method of claim 1, further comprising performing forensic analysis on the graph, wherein ranking the ranked set of the plurality of paths is further based on a result of the forensic analysis.

11. The method of claim 1, further comprising performing general detection on the graph, wherein ranking the ranked set of the plurality of paths is further based on a result of the general detection.

12. A computer system for detecting malicious computers in a computer network, the computer system comprising the following computer components:
a remote file execution detector configured to detect at least one remote file execution event;
a network graph construction module configured to generate a graph representing the computer network, the graph comprising nodes that represent computers and user accounts, and edges that represent computer connections and user logon events;
a path-rate score module configured to determine a path-rate score for a plurality of paths in the graph;
a general detection module configured to process the graph using the at least one remote file execution event and the path-rate score;
a forensic analysis module configured to process the graph using a compromised computer and account list and the path-rate score; and
a ranking module configured to rank the plurality of paths based on at least one of a result from the general detection module or a result from the forensic analysis module, and output results of the ranking, wherein each of the computer components is embodied in hardware in the computer system.

13. The system of claim 12, further comprising an automatic account disabling module configured to disable at least one of a malicious computer or a malicious user account responsive to the results of the ranking.

14. The system of claim 12, wherein the remote file execution detector is configured to detect the least one remote file execution event from at least one computing device of the computer network.

15. The system of claim 12, wherein the ranking module is configured to identify at least one of a malicious computer or a malicious user account in the computer network based on the ranking.

16. The system of claim 12, wherein the plurality of paths comprises 1-hop paths and 2-hop paths.

17. A method for detecting malicious computers in a computer network, the method comprising:
receiving, at a forensic analysis module of a computing device, an identification of a compromised node on a network connection graph corresponding to the computer network, the identification of the compromised node indicating that a computer or account on the computer network indicated by the compromised node is malicious;
receiving, at the forensic analysis module of the computing device, a path-rate score for a plurality of paths in the network connection graph, each of the plurality of paths comprising the compromised node and at least one other node of the network connection graph; and
identifying, at the forensic analysis module of the computing device, lateral movement on the computer network using the identification of the compromised node and the path-rate score for the plurality of paths in the network connection graph.

18. The method of claim 17, wherein identifying lateral movement comprises identifying lateral movement into the compromised node.

19. The method of claim 17, wherein identifying lateral movement comprises identifying lateral movement out of the compromised node.

20. The method of claim 17, wherein identifying lateral movement comprises using 1-hop connections with the compromised node and using 2-hop connections with the compromised node.

* * * * *